Nov. 14, 1933.  F. GELSTHARP  1,934,798

PROCESS AND APPARATUS FOR MAKING INSULATING GLASS

Filed Jan. 27, 1933  6 Sheets-Sheet 1

INVENTOR
FREDERICK GELSTHARP
BY Bradley & Ree
ATTORNEYS

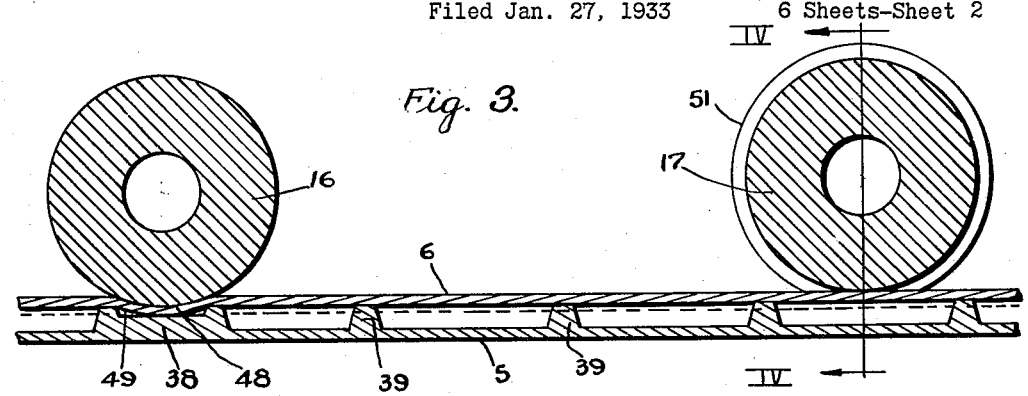
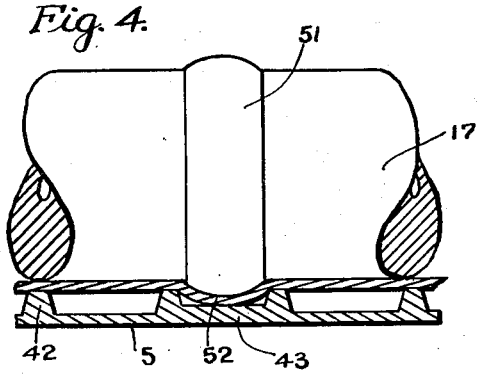
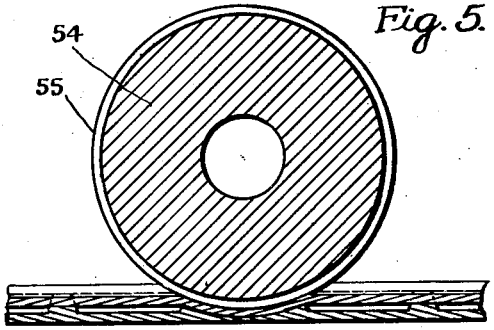
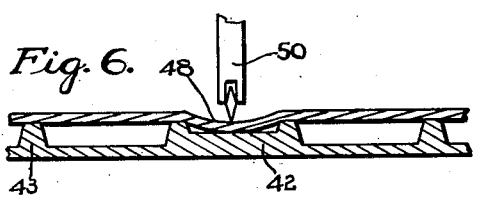
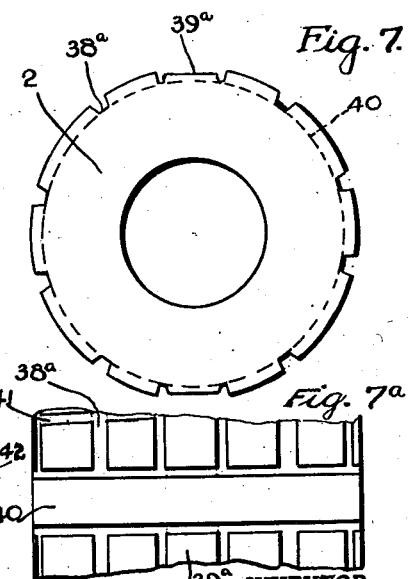
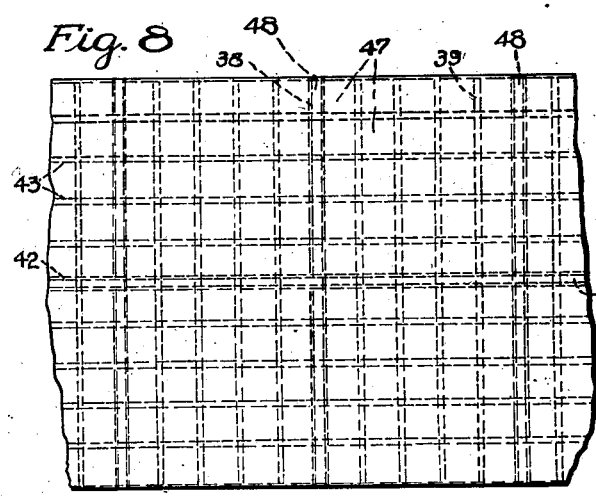

Nov. 14, 1933.  F. GELSTHARP  1,934,798

PROCESS AND APPARATUS FOR MAKING INSULATING GLASS

Filed Jan. 27, 1933   6 Sheets-Sheet 3

INVENTOR
FREDERICK GELSTHARP.
BY
ATTORNEYS

Nov. 14, 1933.  F. GELSTHARP  1,934,798
PROCESS AND APPARATUS FOR MAKING INSULATING GLASS
Filed Jan. 27, 1933   6 Sheets-Sheet 4

INVENTOR
FREDERICK GELSTHARP.
BY
ATTORNEYS

Nov. 14, 1933.   F. GELSTHARP   1,934,798
PROCESS AND APPARATUS FOR MAKING INSULATING GLASS
Filed Jan. 27, 1933   6 Sheets-Sheet 5

INVENTOR
FREDERICK GELSTHARP
BY
Bradley & Bee
ATTORNEYS

Nov. 14, 1933.  F. GELSTHARP  1,934,798
PROCESS AND APPARATUS FOR MAKING INSULATING GLASS
Filed Jan. 27, 1933  6 Sheets-Sheet 6

INVENTOR
FREDERICK GELSTHARP
BY
Bradley & Bee
ATTORNEYS

Patented Nov. 14, 1933

1,934,798

UNITED STATES PATENT OFFICE 1,934,798

PROCESS AND APPARATUS FOR MAKING INSULATING GLASS

Frederick Gelstharp, Tarentum, Pa., assignor to Pittsburgh Plate Glass Company, a corporation of Pennsylvania Application January 27, 1933. Serial No. 653,839

13 Claims. (Cl. 49—3)

Figure 1:
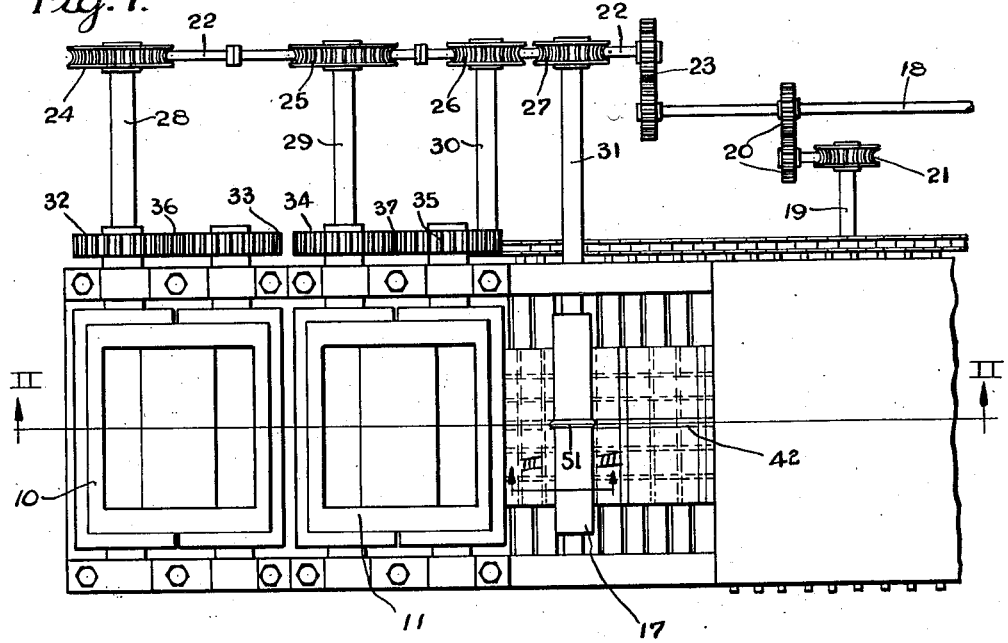
Figure 2:
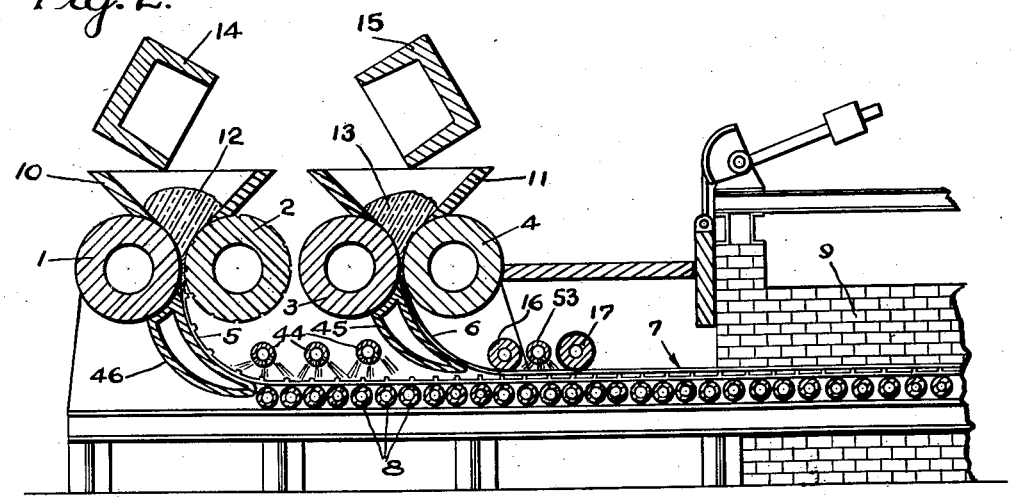
Figure 9:
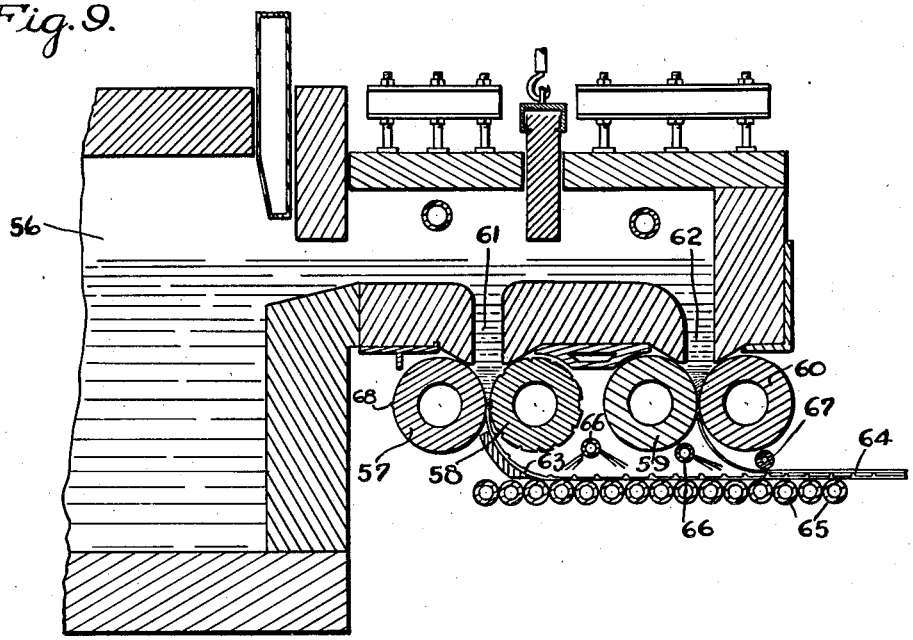
Figure 10:
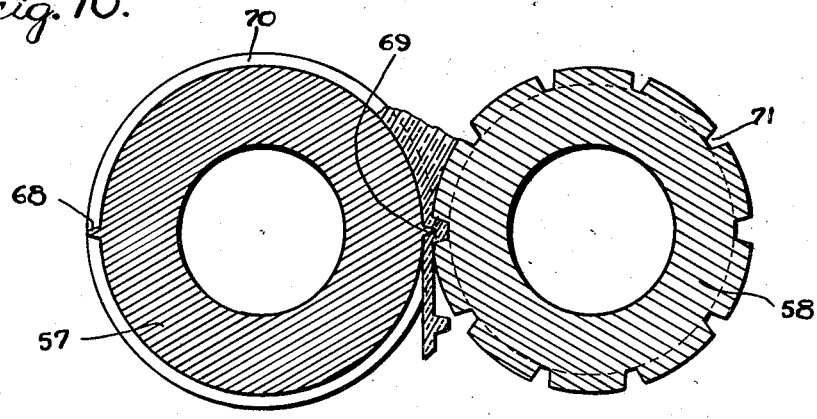
Figure 11:
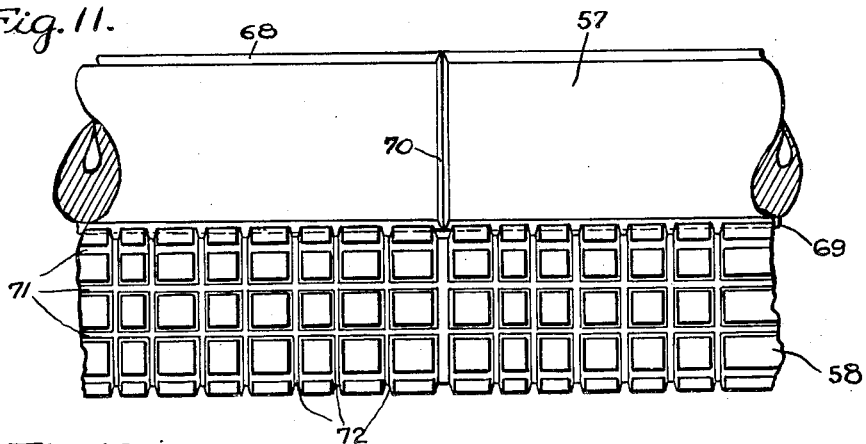
Figure 12:
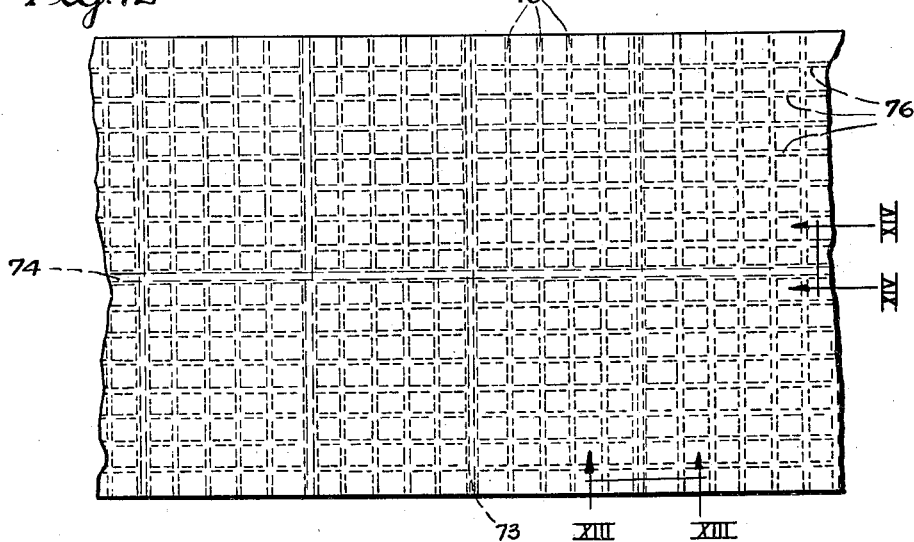
Figure 13:
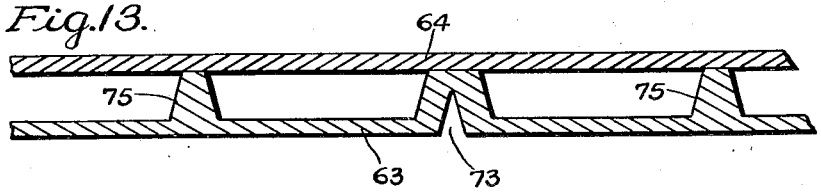
Figure 14:
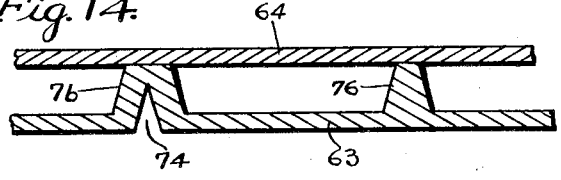
Figure 15:
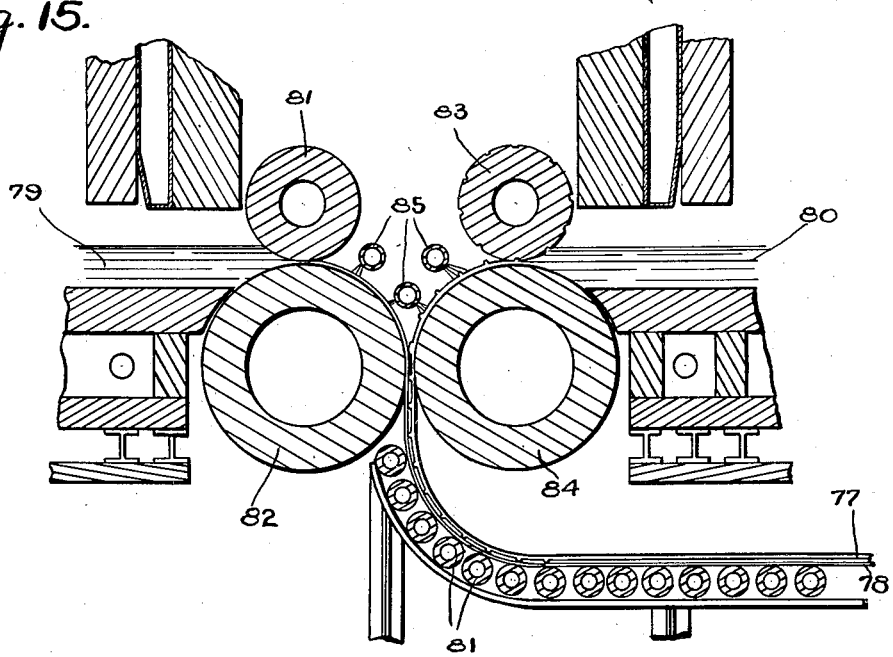
Figure 16:
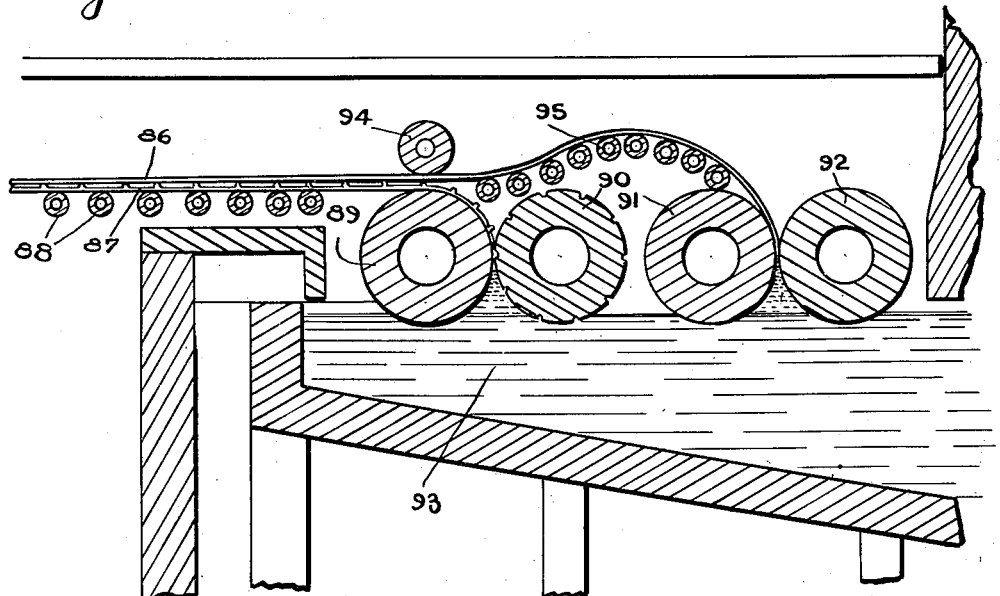
Figure 17:
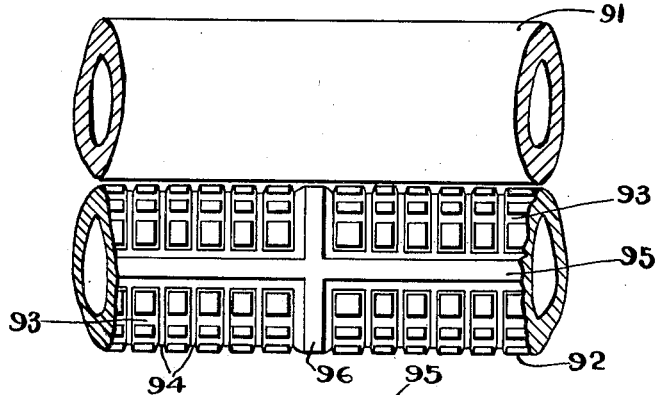
Figure 18:
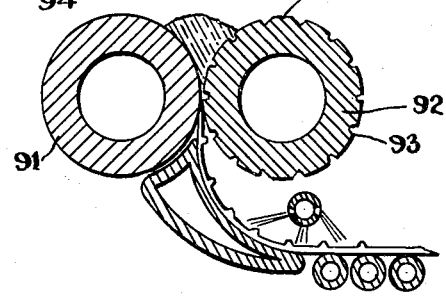
Figure 19:
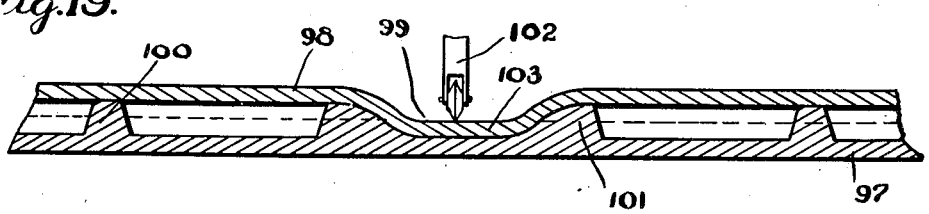
Figure 20:
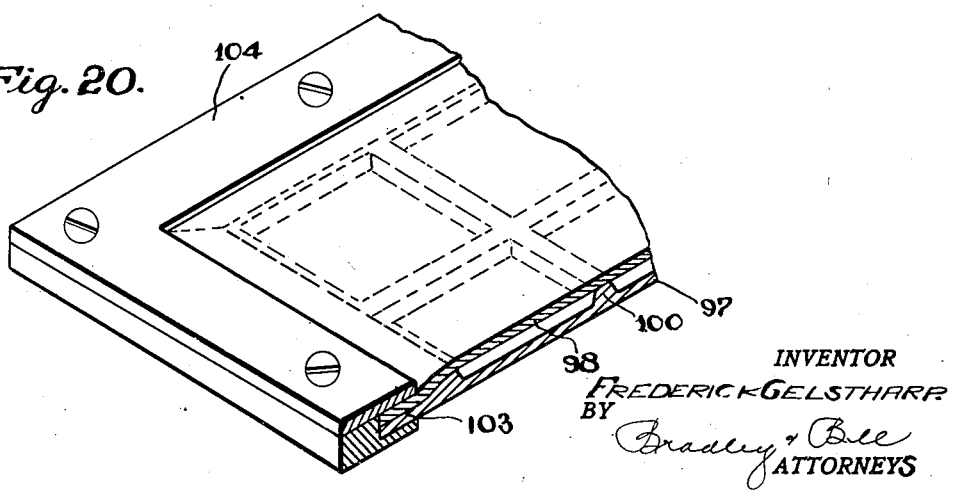

The invention relates to a process and apparatus for making insulating glass for use in the walls of buildings or in other locations where light transmission combined with insulation is desired. The invention has for its primary objects, the provision of an improved process and apparatus whereby the glass may be rolled at a relatively low cost, with little or no breakage, and formed in such manner that the plates or ribbon may be readily divided in units of standard size. Certain forms of apparatus for practicing the invention are illutrated in the accompanying drawings, wherein:

Fig. 1 is a plan view of one form of apparatus. Fig. 2 is a section on the line II—II of Fig. 1. Fig. 3 is an enlarged longitudinal section through the glass plate and the rolls which form the cracking off grooves. Fig. 4 is a section on the line IV—IV of Fig. 3. Fig. 5 is a section similar to that of Fig. 3 through a modification. Fig. 6 is a section through the glass plate showing the cutting tool in position for scoring the glass preliminary to cracking it into sections. Fig. 7 is an enlarged end view of the grooved forming roll which provides for the formation of ribs upon one of the sheets. Fig. 7a is a partial plan view of such roll. Fig. 8 is a plan view of the plate showing the location of the ribs and grooves formed therein. Figs. 9 and 10 illustrate a modification in which the glass is formed by a continuous rolling operation, Fig. 9 being a vertical section through the apparatus, and Fig. 10 being a transverse section through the rolls on an enlarged scale. Fig. 11 is a plan view of the rolls shown in Fig. 10. Figs. 12, 13 and 14 are detail views of the glass formed in the apparatus of Fig. 9, Fig. 12 being a plan view, and Figs. 13 and 14 being sections respectively on the lines XIII—XIII and XIV—XIV of Fig. 12. Figs. 15 and 16 are vertical sections through still other forms of apparatus for making the glass by a continuous process. Figs. 17 and 18 are plan and sectional views showing a further roll construction. Fig. 19 is a sectional view showing the glass plate produced by the rolls of Figs. 17 and 18. And Fig. 20 is a perspective view showing the glass, as produced by the Figs. 17 and 18 construction, mounted in a sash.

Referring to the construction as shown in Figs. 1 to 7, which discloses an apparatus for making the glass by an intermittent process, 1, 2 and 3, 4 are pairs of forming or sizing rolls for making the two sheets 5 and 6 which are rolled together to provide a final composite sheet or plate 7; 8 is a roller bed upon which the glass sheets are carried to the leer 9 and through such leer; 10 and 11 are hoppers to which the bodies of molten glass 12 and 13 are supplied for rolling into the sheets 5 and 6; 14 and 15 are ladles or pots by means of which the glass is brought from the furnace and poured into the hoppers; and 16 and 17 are a pair of rolls for pressing the two sheets which form the final plate together and for forming the cracking off grooves therein, as later described.

The various rolls, including the rolls 8, are all driven in timed relation from the drive shaft 18 which extends along the side of the leer. The rolls 8 have driving connections with the cross shaft 19, and such shaft is driven from the main drive shaft 18 through the intermediary of the spur gears 20 and the worm gearing 21. The shaft 18 also drives a countershaft 22 at the side of the hoppers through the intermediary of the spur gears 23 and the worm gearing 24, 25, 26 and 27. These gears drive the shafts 28, 29, 30 and 31, the two latter being the shafts of the rolls 16 and 17. The shafts 28 and 29 drive the sizing rolls 1, 2 and 3, 4 through the intermediary of spur gears 32 and 33, and 24 and 35, and the pinions 36 and 37.

The sheet 5, which constitutes the lower member of the completed plate, is formed between the sizing rolls 1 and 2, the roll 1 having a plain surface, and the roll 2 being grooved transversely, as indicated at 38a and 39a in Fig. 7, in order to provide the transverse ribs 38, and 39, 39, etc. upon the upper face of the sheet 5. This roll is also provided with circumferential grooves 40 and 41 for forming the ribs 42 and 43 extending longitudinally of the sheet and at right angles to the ribs 38 and 39. The other pair of forming rolls 3 and 4 have plain surfaces so that the sheet 6 is perfectly plain on both sides. In order that the sheets may weld together rigidly, provision is made for heating the upper face of the sheet 5 preliminary to its joinder with the sheet 6, this being accomplished by means of the gas burners 44 which play upon the surface of the sheet. The sheets are guided in their movement from the sizing rolls to the roller bed 8 by means of the apron members 45 and 46, which are hollow and may be cooled by a circulation of fluid therethrough to prevent their becoming over heated. The sizing rolls 1 and 2, and 3 and 4, and the rolls 16 and 17 are also preferably made hollow and provision is made for circulating fluid therethrough as is well known in the art. Similarly as to the rolls 8 constituting the roller bed, which requires some cooling particularly those with which the glass sheets first contact.

The roll 16 is loosely mounted in its bearings so that it has a limited amount of vertical play and rests by gravity upon the upper surface of the sheet 7 passing therebeneath. The pressure exerted by this roll causes the sheet 6 to be pressed tightly into contact with the tops of the ribs 38, 39, 42 and 43, so that the opposing surfaces weld together forming an integral sheet with rectangular air pockets 47 between the two sheets, thus giving a completed product which can be used for insulating purposes and at the same time permit the passage of a considerable amount of light. The roll 16 performs the further function of pressing the top sheet 6 down at intervals so as to provide the cracking off grooves, as indicated at 48 in Fig. 3. The ribs 38 are provided at their tops with grooves 49 which permit of this pressing down of the top sheet to give grooves transversely of the glass for severing the sheet into sections. This is accomplished by means of a wheel 50 (Fig. 6) or other suitable scoring device, the glass being scored on its upper side, and since the two sheets 5 and 6 are welded together, both sheets will crack off opposite the scored line when a bending force is applied at the line of scoring. Without an expedient of this kind, involving the use of the elongated ribs 38, it would be difficult to sever the completed plate into sections of sizes suitable for use. The roll 17 which is in advance of the roll 16 is provided at its center with a rib 51, such rib coming opposite the longitudinal rib 42 (Fig. 4) on the sheet 5 so that the top sheet 6 is forced down longitudinally of the sheet to provide the cracking off groove 52, thus permitting of a longitudinal serverance of the plate as heretofore described in connection with the severance of the plate transversely.

A burner 53 located between the rolls 16 and 17 serves to reheat the upper sheet 6 and thus facilitate the pressing down of such upper sheet to form the longitudinal cracking off groove 52. If desired, a single roll may be substituted for the two rolls 16 and 17, such construction being illustrated in Fig. 5, in which the roll 54 is provided with a rib 55 and rests by gravity upon the upper sheet so as to perform the function of providing both the transverse and longitudinal cracking off grooves, the section shown being taken transversely through the roll at the plane of the rib 5 which lies midway between the ends of the roll.

Fig. 9 illustrates a modification in which a melting tank 56 is employed to supply glass to the pairs of forming rolls 57, 58, and 59, 60, the operation in this case being a continuous one instead of an intermittent one as is the case with the construction of Figs. 1 and 2 and in this case the glass is supplied by gravity through the slots 61 and 62 to the passes between the rolls and the two sheets 63 and 64 are formed, such sheets being conducted along the roller runway 65 to a roller leer as in the other type of construction. In this case the burners 66 are employed to reheat the sheet 63 and a roll 67 applies the pressure necessary to cause the sheets to weld together. The rolls 57 and 58 are provided with grooves and ribs, as indicated in Figs. 10 and 11, the roll 57 being formed with three ribs 68, 69 and 70 to provide the cracking off grooves in the finally formed plate, and the roll 58 being provided with the grooves 71 and 72 which cause the formation of the ribs on the upper face of the sheet 63. The result of the use of the rolls 57 and 58 will be seen by reference to Figs. 12 to 14. The longitudinal cracking off groove 73 is formed by the rib 70 on the roll 57, while the transverse cracking off grooves 74 are formed by the ribs 68 and 69 on the roll 57. The longitudinal ribs 75 on the sheet 63 are formed by the grooves 72 on the roll 58, while the transverse ribs 76 on the sheet are formed by the grooves 71 on the roll.

Fig. 15 illustrates a further modification in which the two sheets 77 and 78 are rolled continuously from the bodies of glass 79 and 80, such sheets being delivered onto the rolls 81 which carry the completed plate into a roller leer. The two supplies of glass 79 and 80 are furnished from a melting tank which is not shown. In this construction, the lower plain sheet is formed between the rolls 81 and 82, while the upper ribbed sheet is formed between the rolls 83 and 84, the roll 84 being plain, while the roll 83 is provided with grooves for forming ribs on the face of the sheet 77. The burners 85 are employed to supply additional heat to the faces of the two sheets 77 and 78, which are pressed together by means of the rolls 82 and 84.

Fig. 16 shows a further modification in which the two sheets 86 and 87 are formed by a vertical rolling operation and carried laterally to a roller leer on the runway rollers 88. The pairs of rolls 89, 90 and 91, 92 have their peripheries in engagement with a body of glass 93 which communicates with a suitable melting tank. The forming or sizing rolls in this case, as in all the others shown herein, are hollow and water cooled in the usual way. The roll 94 is placed opposite the roll 89 in order to apply the pressure necessary to cause the sheets to weld together and the sheet 86 is conducted beneath the roll 94 by means of the roller apron 95. The upper sheet 86 is formed between the plain rollers 91 and 92, while the lower sheet 87 is formed between the rolls 89 and 90, the latter of which is grooved to form the ribs on the face of the sheet.

Figs. 17 to 20 illustrate a modification in which a part of the cracking off grooves are widened and deepened, so that when the plate is separated into sections or panes, borders are provided suitable for being mounted in an ordinary sash. The glass plate or ribbon, when subdivided, is ready to mount in the sash, despite the thickness of the main body of the pane. Referring to the drawings, 91 and 92 are rolls corresponding to the rolls 1 and 2 of Figs. 1 and 2. The roll 91 has a plain surface, while the roll 92 has two sets of grooves extending longitudinally thereof, and two sets extending circumferentially. The grooves 93 and 94 are narrow, while the grooves 95 and 96 are much wider, such latter wider grooves being designed to produce the border portions of the panes. In operation, the rolls 91 and 92 produce the lower ribbed sheet 97 (Fig. 19), while the upper plain sheet 98 is produced between rolls having plain surfaces like the rolls 3 and 4 of Figs. 1 and 2. The sheets are pressed together by rolls similar to the rolls 16 and 17 of Figs. 1 and 2, so that cracking off grooves 99 (Fig. 19) are produced extending longitudinally and transversely of the finished plate. The roll 92 produces the ribs 100 and 101 as heretofore described in connection with the structure of Figs. 1 and 2. When the sheet is cut into sections by the cutter 102, the panes, as thus produced, have border portions 103, which are relatively thin, and suitable for mounting in ordinary sash, such as the sash 104 of Fig. 20, such figure showing one corner of a sash and pane.

It will be noted that the various methods herein illustrated involve the provision of the insulating recesses or pockets by rolling one sheet plain and the other ribbed, which is the preferred procedure, but it is possible to roll ribs on the opposing faces of both sheets, so that both sheets are similarly ribbed but with the ribs of less height than where only one sheet is ribbed. This method, however, requires very careful timing of the two sets of rolls in order to make the two sets of ribs match accurately, and other difficulties of manufacture arise which make the method illustrated much superior from a practical standpoint. It will be understood, however, that this alternative method of manufacture is contemplated in such of the claims as are not limited by their terms to rolling one of the opposing sheet faces with a plain surface.

What I claim is:

1. A process of making insulating glass, which consists in simultaneously rolling two sized sheets from molten glass and forming intersecting ribs on one face of one of such sheets during such rolling, and causing said ribbed face to engage the face of the other sheet and weld thereto so as to form air pockets in the areas bounded by the ribs.

2. A process of making insulating glass, which consists in simultaneously rolling two sized sheets from molten glass and forming intersecting ribs on one face of one of such sheets during such rolling, reheating said ribbed face, causing said ribbed face to engage the face of the other sheet and weld thereto, and applying pressure to the sheets after their faces engage.

3. A process of making insulating glass, which consists in simultaneously rolling two sized sheets from molten glass and forming intersecting ribs on one face of one of such sheets during such rolling, and also rolling cracking off grooves into said face, causing said ribbed and grooved face to engage the face of the other sheet and weld thereto, and rolling grooves into said other sheet in opposition to said cracking off grooves.

4. A process of making insulating glass, which consists in simultaneously rolling two sized sheets from molten glass and forming intersecting ribs on one face of one of such sheets during such rolling, and also rolling cracking off grooves into said face longitudinally and transversely thereof, causing said ribbed and grooved face to engage the face of the other sheet and weld thereto, and rolling longitudinal and transverse grooves into said other sheet in opposition to said cracking off grooves.

5. A process of making insulating glass, which consists in simultaneously rolling two sized sheets from molten glass and forming intersecting ribs on one face of one of such sheets during such rolling, and cracking off grooves on the other face of said sheet in opposition to certain of the ribs during such rolling, and causing said ribbed face to engage the face of the other sheet and weld thereto so as to form air pockets in the areas bounded by the ribs.

6. A process of making insulating glass, which consists in simultaneously rolling two sheets of glass, one plain and the other recessed on its inner face, causing the recessed face of the one sheet to engage the face of the other sheet while highly heated and plastic and while the sheets move forward to form an integral composite sheet containing air pockets corresponding to said recesses, and at regular intervals forcing inward the plastic glass on one side of said composite sheet along transverse lines to provide cracking off grooves in such sheet.

7. A process of making insulating glass, which consists in simultaneously rolling two sheets of glass, one plain and the other with recesses on its inner face, causing the recessed face of the one sheet to engage the face of the other sheet while highly heated and plastic and while the sheets move forward to form an integral composite sheet containing air pockets corresponding to said recesses, and at regular intervals forcing inward the plastic glass on one side of said composite sheet along longitudinal and transverse lines to provide cracking off grooves in such sheet.

8. Apparatus for making insulating glass comprising two pairs of driven sizing or forming rolls, means for supplying molten glass between the rolls, and means for conducting the two sheets or ribbons of glass formed between the rolls together so that their faces engage and weld together forming a single integral plate, one of said rolls being provided with two sets of intersecting grooves so that intersecting ribs are formed on the face of one of the sheets which engage the face of the other sheet, thus providing air pockets in said plate.

9. Apparatus for making insulating glass comprising two pairs of driven sizing or forming rolls, means for supplying molten glass between the rolls, and means for conducting the two sheets or ribbons of glass formed between the rolls together so that their faces engage and weld together forming a single integral plate, one of said rolls being provided with two sets of intersecting grooves, one set extending longitudinally of the roll and the other set extending circumferentially thereof, so that intersecting ribs are formed on the face of one of the sheets which engage the face of the other sheet, thus providing air pockets in said plate.

10. Apparatus for making insulating glass comprising two pairs of driven sizing or forming rolls, means for supplying molten glass between the rolls, means for conducting the two sheets or ribbons of glass which are formed together so that their faces engage and weld into an integral plate, two sets of intersecting grooves being provided in the face of one of said rolls so that ribs are formed on the face of the sheet which engage the face of the other sheet, and means for pressing cracking off grooves at regular intervals in the outer face of one of said sheets in alignment with the transverse ribs.

11. Apparatus for making insulating glass comprising two pairs of driven sizing or forming rolls, means for supplying molten glass between the rolls, means for conducting the two sheets or ribbons of glass which are formed together so that their faces engage and weld into an integral plate, two sets of intersecting grooves being provided in the face of one of said rolls so that ribs are formed on the face of the sheet which engage the face of the other sheet, and a rib extending longitudinally of the sizing roll which opposes the grooved roll for pressing cracking off grooves in the outer face of the sheet at spaced intervals in alignment in each instance with one of the transverse ribs on said sheet.

12. Apparatus for making insulating glass comprising two pairs of driven sizing or forming rolls, means for supplying molten glass between the rolls, means for conducting the two sheets or ribbons of glass which are formed together so that their faces engage and weld into an integral plate, two sets of intersecting grooves being provided in the face of one of said rolls so that ribs are formed on the face of the sheet which engage the face of the other sheet, and means in the line of travel of the integral plate for pressing cracking off grooves at regular intervals in the outer face of the sheet which opposes the ribbed sheet, such cracking off grooves being formed in each case in alignment with one of the transverse ribs on said sheet.

13. Apparatus for making insulating glass comprising two pairs of driven sizing or forming rolls, means for supplying molten glass between the rolls, means for conducting the two sheets or ribbons of glass which are formed together so that their faces engage and weld into an integral plate, two sets of intersecting grooves being provided in the face of one of said rolls so that ribs are formed on the face of the sheet which engage the face of the other sheet, ribs on said last roll for forming cracking off grooves in certain of said ribs, and means engaging the outer face of the sheet which is not ribbed for pressing cracking off grooves into said sheet in opposition to said first cracking off grooves.

FREDERICK GELSTHARP.